United States Patent
Bhathija et al.

(10) Patent No.: US 8,550,830 B1
(45) Date of Patent: Oct. 8, 2013

(54) CONNECTOR FOR INTERCONNECTING THREE BUSWAY AT ITS THREE ENDS

(75) Inventors: Kuldeep Kumar Bhathija, Secunderabad (IN); Steven English Richard, Selmer, TN (US); Michael Richard Wood, Southington, CT (US); Jeffery Lynn Cox, Selmer, TN (US); Shravan Purohit, Secunderabad (IN)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 13/486,112

(22) Filed: Jun. 1, 2012

(51) Int. Cl.
*H01R 4/60* (2006.01)

(52) U.S. Cl.
USPC .......................................................... 439/213

(58) Field of Classification Search
USPC .................................................. 439/210–213
See application file for complete search history.

(56) References Cited

U.S. PATENT DOCUMENTS

| | | | |
|---|---|---|---|
| 3,004,097 A | 10/1961 | Johnston et al. | |
| 3,489,846 A | 1/1970 | Fehr, Jr. | |
| 3,681,509 A | 8/1972 | Johnston et al. | |
| 3,786,394 A * | 1/1974 | Koenig et al. | 439/213 |
| 3,829,642 A | 8/1974 | Graybill | |
| 4,009,920 A | 3/1977 | Hicks, Jr. et al. | |
| 4,174,143 A * | 11/1979 | Hicks et al. | 439/213 |
| 4,487,994 A | 12/1984 | Bahder | |
| 4,615,114 A | 10/1986 | Jones et al. | |
| 4,627,680 A * | 12/1986 | Weimer et al. | 439/210 |
| 4,804,804 A * | 2/1989 | Hibbert et al. | 174/16.2 |
| 4,842,533 A * | 6/1989 | Beberman et al. | 439/213 |
| 4,849,581 A * | 7/1989 | Larkin et al. | 174/88 B |
| 4,979,906 A | 12/1990 | Shrout et al. | |
| 5,122,072 A | 6/1992 | Arn et al. | |
| 5,760,339 A * | 6/1998 | Faulkner et al. | 174/88 B |
| 6,045,379 A | 4/2000 | Wagener | |
| 6,146,169 A * | 11/2000 | Calder et al. | 439/213 |
| 6,352,193 B1 | 3/2002 | Bellino et al. | |
| 6,435,888 B1 * | 8/2002 | Reed, Jr. | 439/213 |
| 7,249,410 B2 | 7/2007 | Zettle | |
| 7,819,681 B1 * | 10/2010 | Rodrigues et al. | 439/213 |
| 2010/0012375 A1 * | 1/2010 | Jur et al. | 174/88 B |

* cited by examiner

*Primary Examiner* — Chandrika Prasad
(74) *Attorney, Agent, or Firm* — General Electric Company (57) ABSTRACT

A connector for interconnecting three busway sections is described. The connector includes a stack of substantially "T" shaped plate conductors. At least two of the plate conductors are separated from one another by an insulator plate. The stack has a first end configured to couple to a first busway section, a second end configured to couple to a second busway section, and a third end configured to couple to a third busway section. The connector includes a top cover plate, a bottom cover plate, a top insulator plate, and a bottom insulator plate. The top insulator plate couples the top cover plate to the stack and the bottom insulator plate couples the bottom cover plate to the stack.

20 Claims, 5 Drawing Sheets

CONNECTOR FOR INTERCONNECTING THREE BUSWAY AT ITS THREE ENDS

BACKGROUND OF THE INVENTION

The field of the disclosure relates generally to electrical power distribution using a busway system, and more specifically, to methods and systems for coupling fittings within the busway system.

A busway system may be included within an electrical power distribution system. Busway systems typically include a plurality of busway sections joined together by joint sections to provide an appropriate length of busway. Busway systems are typically used in industrial or commercial buildings as an alternative to cable and conduit. Use of busway systems may decrease installation time and cost when compared to cable and conduit, and may also be a lower weight alternative to cable and conduit.

When three busway sections are to be connected in a "T" shaped arrangement, a tee connector is commonly used. Some known tee connectors are constructed using three flared end connections to allow connection to the end of the three busway sections extending beyond the tee. The middle portion of the tee is constructed by welding center leg bars to the edge of a straight section of bus bars. Once the bars are welded, a housing, which was generally constructed in the same manner, is attached around the bus bars. The result is a "T" shaped stack of busway bars with flared portions at all three ends. Each end of such a connector is identical to a standard busway section. Thus, to connect a busway section to the tee connector, a basic connector, such as is used for connecting two straight busway sections together, must be used. When three busway sections are connected using such a tee connector, the assembly includes the tee connector, three basic connectors, and the three busway sections.

BRIEF DESCRIPTION OF THE INVENTION

In one aspect, a connector for interconnecting three busway sections is provided. The connector includes a plurality unitary conductive plates having first and second opposing planar surfaces, a plurality of insulating plates interspersed between at least two adjacent pairs of conductive plates of the plurality of conductive plates, and a plurality of fasteners extending through the plurality of conductive plates and the plurality of insulating plates. Each conductive plate of the plurality of conductive plates includes a central section, a first arm extending from a first side of the central section, a second arm extending from a second side of the central section opposite the first side of the central section, and a third arm extending from a third side of the central section substantially orthogonal to the first and second arms. Each conductive plate of the plurality of conductive plates is stacked such that at least one of the first and second opposing planar surfaces is adjacent at least one of the first and second opposing planar surfaces of an adjacent conductive plate of the plurality of conductive plates.

In another aspect, a connector for interconnecting three busway sections is provided. The connector includes a stack of substantially "T" shaped plate conductors. At least two of the plate conductors are separated from one another by an insulator plate. The stack has a first end configured to couple to a first busway section, a second end configured to couple to a second busway section, and a third end configured to couple to a third busway section. The connector includes a top cover plate, a bottom cover plate, a top insulator plate, and a bottom insulator plate. The top insulator plate couples the top cover plate to the stack and the bottom insulator plate couples the bottom cover plate to the stack.

In yet another aspect, a weldless tee joint connector for interconnecting three busway sections is provided. The connector includes a stack of insulator plates and conductive plates, a first cover plate adjacent a top of the stack, a second cover plate adjacent a bottom of the stack, and a plurality of fasteners extending through the first cover plate, the stack, and the second cover plate. At least one insulator plate is positioned between two adjacent conductive plates. The stack defines a first extension for coupling to a first busway section, a second extension for coupling to a second busway section, and a third extension for coupling to a third busway section.

DETAILED DESCRIPTION OF THE INVENTION

The embodiments described herein include systems and methods for coupling components in a busway system. The systems and methods facilitate coupling components in a busway system while sealing an interior of the busway system from contaminants. The systems and methods also allow use of a proven seal plane while providing electrical ground contact between the components.

Figure 1:
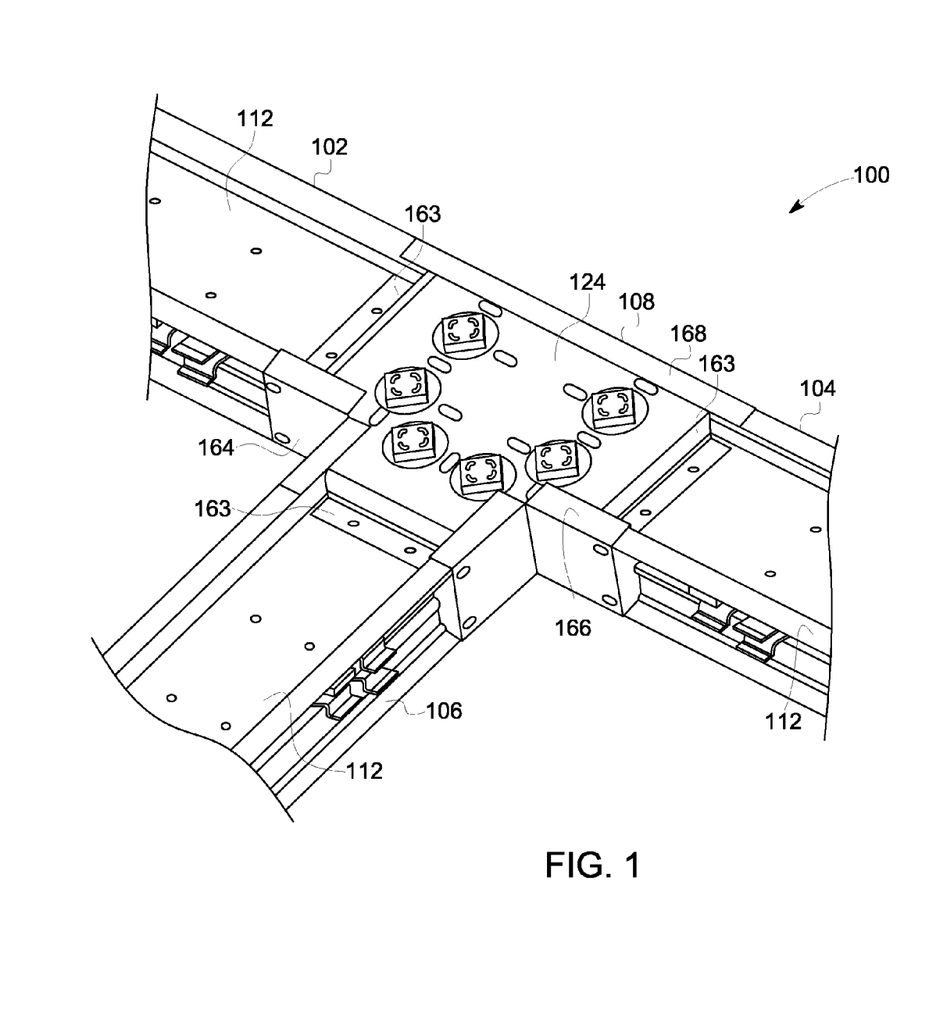
FIG. 1 is a perspective view of an exemplary embodiment of a busway electrical distribution system including a connector.
Figure 2:
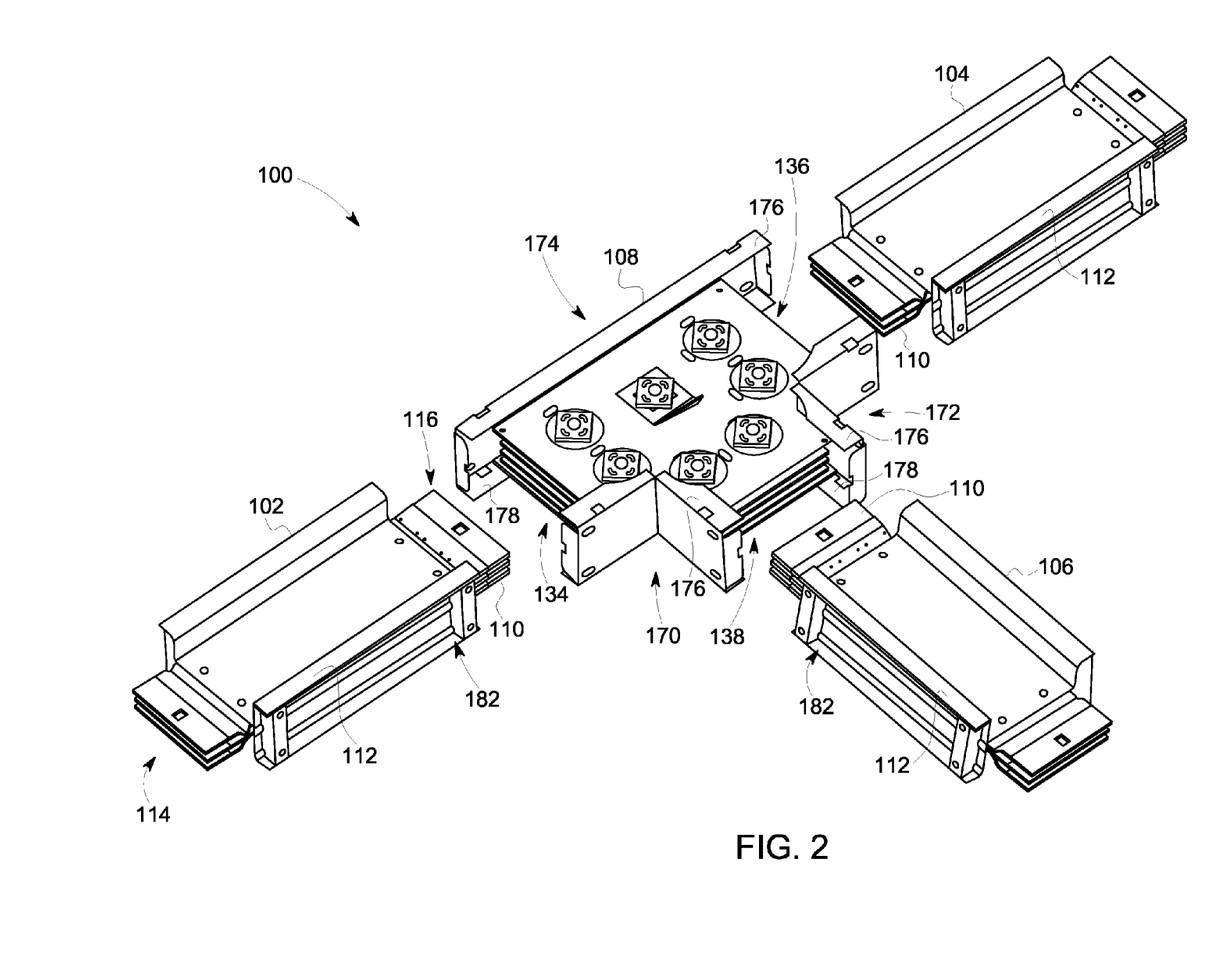
FIG. 2 is a partially exploded perspective view of the busway electrical distribution system shown in FIG. 1.

FIG. 1 is a perspective view of an exemplary embodiment of a busway electrical distribution system 100. FIG. 2 is a partially exploded view of busway electrical distribution system 100. Busway electrical distribution system 100 includes a first busway section 102, a second busway section 104, and a third busway section 106. First busway section 102, second busway section 104, and third busway section 106 are coupled together by a connector 108.

Busway sections 102, 104, and 106 each includes a plurality of conductors 110 within a housing 112. The plurality of conductors 110, also referred to herein as busbars, extend from a first end 114 of housing 112 to a second end 116 of housing 112. In one embodiment, conductors 110 are fabricated from copper. In other embodiments, conductors 110 are fabricated from any other suitable conductive material including, for example, aluminum. In the exemplary embodiment, housing 112 is utilized as a ground path. In some embodiments, one of conductors 110 may be, additionally or alternatively, a grounding conductor. In one embodiment housing 112 is fabricated from aluminum. In other embodiments, housing 112 is fabricated from any other material suitable for housing conductors 110. In embodiments in which housing 112 is not utilized as a ground path, housing 112 may be fabricated from nonconductive materials.

In the exemplary embodiment, each of busway sections 102, 104, and 106 includes three conductors 110. In other embodiments busway sections 102, 104, and 106 may include more or fewer conductors 110. In some direct current (DC) systems, for example, busway sections 102, 104, and 106 may each include two conductors 110, while some three phase systems may include busway sections 102, 104, and 106 having four or five conductors 110.

Connector 108 couples first busway section 102, second busway section 104, and third busway section 106. More specifically, connector 108 couples conductors 110 of first, second and third busway sections 102, 104, and 106 to each other. In the exemplary embodiment, connector 108 also couples together housing 112 of each busway section 102, 104, and 106 ensuring proper grounding between first busway section 102, second busway section 104, and third busway section 106.

Figure 3:
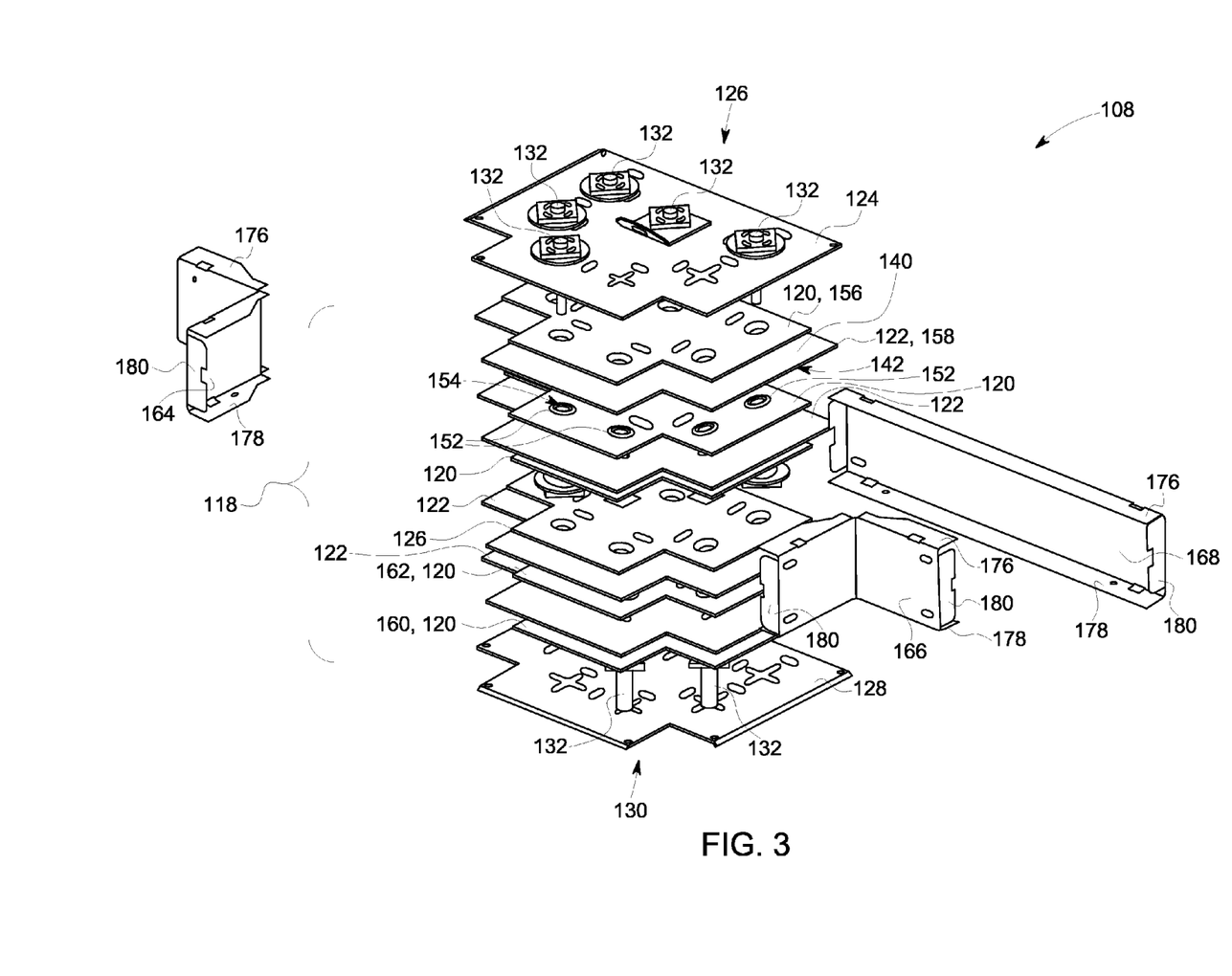
FIG. 3 is an exploded view of the connector shown in FIG. 1.

With additional reference now to FIG. 3, connector 108 includes a stack 118 of alternating insulator plates 120 and conductive plates 122 (also sometimes referred to as plate conductors). A first cover plate 124 is positioned adjacent a top 126 of stack 118, and a second cover plate 128 is positioned adjacent a bottom 130 of stack 118. Fasteners 132 extend through first cover plate 124, stack 118, and second cover plate 128 to physically couple first cover plate 124, stack 118, and second cover plate 128 together. In one embodiment, fasteners 132 are bolts. In alternative embodiments, fasteners 132 are other devices configured to couple first cover plate 124, stack 118, and second cover plate 128 together. Stack 118 defines a first extension 134, also referred to as a first end, for coupling to first busway section 102, a second extension 136, also referred to as a second end, for coupling to second busway section 104, and a third extension 138, also referred to as a third end, for coupling to third busway section 106.

In the exemplary embodiment, conductive plates 122 are fabricated from copper. In other embodiments, any other suitable electrically conductive material, or combination of materials, may be used to fabricate conductive plates 122. Conductive plates 122 are substantially planar shapes having a first planar surface 140 and a second planar surface 142 opposite first planar surface 140.

Figure 4:
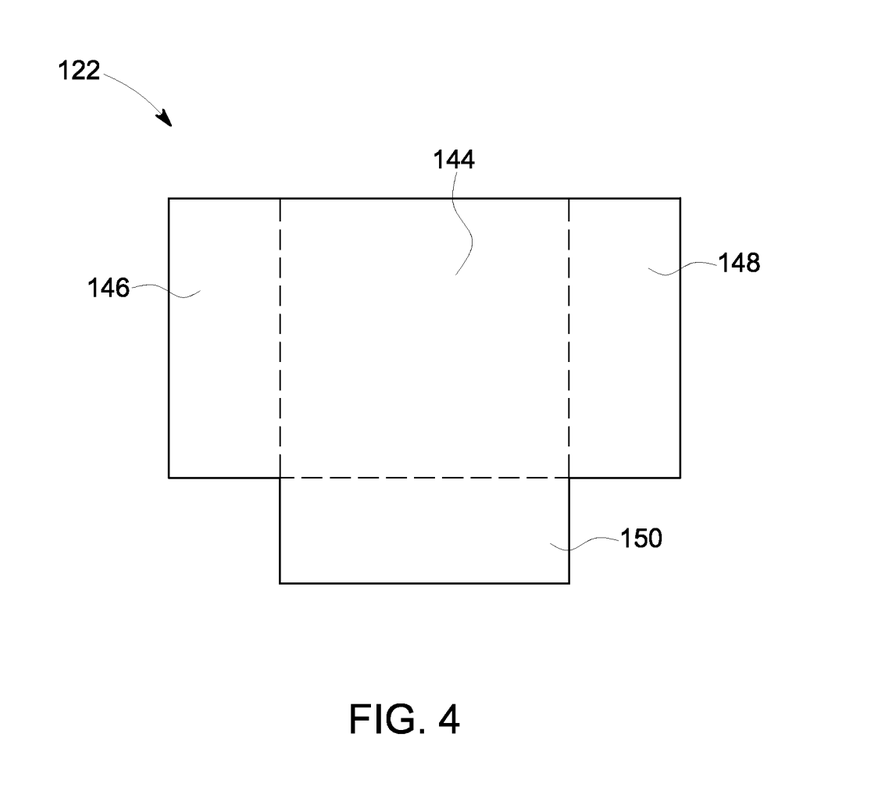
FIG. 4 is top plan view of a conductive plate for the connector shown in FIG. 1.

As shown in the top plan view of one conductor plate 122 in FIG. 4, conductive plates 122 are substantially shaped like the English letter "T". Conductive plates 122 include a central section 144. A first arm 146 extends from a first side of central section 144 and a second arm 148 extends from a second side of central section 144 opposite the first side of central section 144. A third arm 150 extends from a third side of central section 144 substantially orthogonal to first arm 146 and second arm 148. In the exemplary embodiment, each conductor plate 122, and specifically central section 144, first arm 146, second arm 148, and third arm 150, are unitary and formed of a single piece of material. In the exemplary embodiment the material is a copper sheet. In other embodiments, the material includes other suitable conductive materials, such as aluminum. Moreover, the material may itself comprise more than one component, including alloys, layers, platings, etc. Conductive plates 122 are fabricated from the material monolithically, e.g. without welding or soldering multiple pieces of the material together to form the shape of conductor plate 122. The conductive plates may be formed, for example, by stamping, cutting, molding, etching, or any other suitable technique for monolithically forming the material into conductive plates 122.

With reference again to FIG. 3, insulator plates 120 separate, both physically and electrically, conductive plates 122 from one another. Thus, each insulator plate 120 is positioned between two conductive plates 122 in stack 118 to facilitate preventing electrical or physical connection of the two adjacent conductive plates 122. In the exemplary embodiment, insulator plates are thermoset fiberglass-reinforced polyester insulators. In other embodiments, any other suitable insulating material may be used to fabricate insulator plates 120. In some embodiments more than one insulator plate 120 may be positioned between adjacent conductive plates 122.

In the exemplary embodiment, insulator plates 120 have substantially the same shape as conductive plates 122. Insulator plates 120 are slightly smaller than conductive plates 122 to facilitate receiving conductors 110 within stack 118 for coupling to conductive plates 122. In other embodiments, insulator plates 120 may have any other suitable shape and size. In some embodiments, insulator plates 120 are not a single plate, but include multiple parts.

Stack 118 includes one or more spacers 152 for increasing the physical separation of adjacent conductive plates 122. Spacers 152 are integrally formed in insulator plates 120. More specifically, spacers 152 are formed around bolt holes 154, through which bolts 132 pass when stack 118 is assembled. Other embodiments may include more or fewer spacers 152, including no spacers 152. Moreover, other embodiments may, additionally or alternatively, include spacers 152 that are not integrally formed in insulator plates 120, are separately attached to insulator plates 120, and/or are located other than around bolt holes 154.

Insulator plates 120 are also positioned to separate, both physically and electrically, conductive plates 122 from first and second cover plates 126 and 128. More specifically, a top insulator plate 156 separates a top conductor plate 158 from first cover plate 126. A bottom insulator plate 160 separates a bottom conductor plate 162 from second cover plate 128. Thus, insulator plates 156 and 160 facilitate preventing electrical connection or physical contact between first and second cover plate 126 and 128 and conductive plates 122 (and more specifically top and bottom conductive plates 158 and 162).

First cover plate 124 and second cover plate 128 cover the top and bottom of stack 118 and function as ground planes between first, second and third busway sections 102, 104, and 106. As seen in FIG. 1, cover plates 124 and 128 are coupled to busway section 102, 104, and 106 by ground connectors 163. Ground connectors 163 are fastened to busway sections 102, 104, and 106, such as with screws, bolts, etc., and extend over and contact cover plates 124 and 128 when busway sections 102, 104, and 106 are plugged into connector 108. In the exemplary embodiment, first and second cover plates 124 and 128 are shaped substantially the same as conductive plates 122 and are fabricated from sheet steel. In other embodiments, first and second cover plates 124 and 128 may have any other suitable shape and/or may be fabricated from any other suitable electrically conductive material. In embodiments in which first and second cover plates 124 and 128 are not utilized as a ground path, first and second cover plates 124 and 128 may be fabricated from any nonconductive material suitable for covering the top and bottom of stack 118.

Connector 108 includes a first cover 164, a second cover 166, and a third cover 168 to provide additional protection, e.g. prevention of ingress of material, dust, etc., to connector 108 and, more particularly, to stack 118. First, second, and third covers 166, 168, and 170 are removably coupled to stack 118 and may be fabricated from any suitable material including, for example, steel, aluminum, plastic, and/or fiberglass. With reference to FIG. 2, a first corner 170 extends between first end 134 and third end 138, and a second corner 172 extends between second and third ends 136 and 138. A longitudinal edge 174 extends between first end 134 and second end 136. First cover 164 is coupled to first corner 170 and second cover 164 is coupled to second corner 172. Third cover 166 is coupled to longitudinal edge 174.

First, second, and third covers 164, 166, and 168 are generally coupled to the remainder of connector 108 after connector 108 is coupled to two or more of the first, second, and third busway sections 102, 104, and 106. Covers 164, 166, and 168 each include flanges 176 that are configured, e.g., sized, shaped, etc., to at least partially overlie housing 112, and flanges 178 that are configured to at least partially underlie housing 112. Moreover, covers 164, 166, and 168 each include tabs 180 configured to be fit within a channel 182 within housing 112.

To perform an installation using connector 108, first busway section 102 is inserted into first end 134, second busway section 104 is inserted into second end 136, and third busway section 106 is inserted into third end 138. Fasteners 132 are tightened by the user to compress stack 118 to facilitate contact between conductors 110 and conductive plates 122 and to retain busway sections 102, 104, and 106 coupled to connector 108. Covers 164, 166, and 168 are then positioned in corners 170 and 172 and along longitudinal edge 174.

Figure 5:
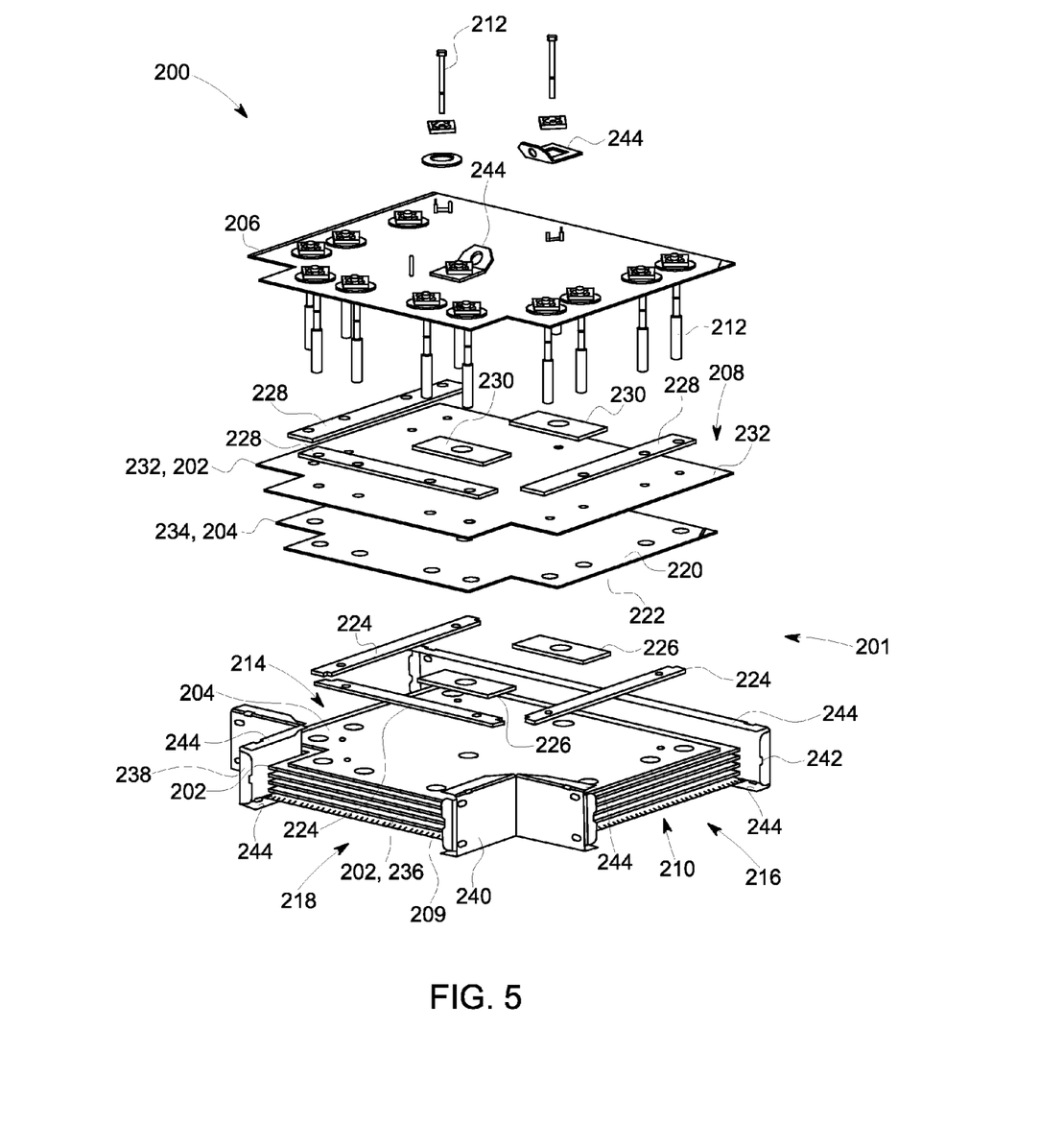
FIG. 5 is a partially exploded view of another connector for use in the busway electrical distribution system shown in FIG. 1.

FIG. 5 is a partially exploded view of another embodiment of a connector 200 for use in busway electrical distribution system 100 (shown in FIGS. 1 and 2). Connector 200 may be used instead of or connector 108. In other embodiments, busway electrical distribution system 100 may include both connector 200 and connector 108.

Connector 200 couples first busway section 102, second busway section 104, and third busway section 106. More specifically, connector 200 couples conductors 110 of first, second and third busway sections 102, 104, and 106 to each other. In the exemplary embodiment, connector 200 also couples together housing 112 of each busway section 102, 104, and 106 ensuring proper grounding between first busway section 102, second busway section 104, and third busway section 106.

Connector 200 includes a stack 201 of insulator plates 202 and conductive plates 204. A first cover plate 206 is positioned adjacent a top 208 of stack 201, and a second cover plate 209 is positioned adjacent a bottom 210 of stack 201. Fasteners 212 extend through first cover plate 206, stack 201, and second cover plate 209 to physically couple first cover plate 206, stack 201, and second cover plate 209 together. In one embodiment, fasteners 212 are bolts. In alternative embodiments, fasteners 212 are other devices configured to couple first cover plate 206, stack 201, and second cover plate 209 together. Stack 201 defines a first extension 214, also referred to as a first end, for coupling to first busway section 102, a second extension 216, also referred to as a second end, for coupling to second busway section 104, and a third extension 218, also referred to as a third end, for coupling to third busway section 106.

In the exemplary embodiment, conductive plates 204 are fabricated from copper. In other embodiments, any other suitable electrically conductive material, or combination of materials, may be used to fabricate conductive plates 204. Conductive plates 204 are substantially planar shapes having a first planar surface 220 and a second planar surface 222 opposite first planar surface 220.

Like conductive plates 122 (as shown in FIG. 4), conductive plates 204 are substantially shaped like the English letter "T". Conductive plates 204 include a central section with a first arm extending from a first side of the central section and a second arm extending from a second side of the central section opposite the first side. A third arm extends from a third side of the central section substantially orthogonal to the first arm and the second arm. In the exemplary embodiment, each conductor plate 204, and specifically its central section, first arm, second arm, and third arm, are unitary and formed of a single piece of material. In the exemplary embodiment the material is a copper sheet. In other embodiments, the material includes other suitable conductive materials, such as aluminum. Moreover, the material may itself comprise more than one component, including alloys, layers, platings, etc. Conductive plates 204 are fabricated from the material monolithically, e.g. without welding or soldering multiple pieces of the material together to form the shape of conductor plate 204. The conductive plates may be formed, for example, by stamping, cutting, molding, etching, or any other suitable technique for monolithically forming the material into conductive plates 204.

Insulator plates 202 separate, both physically and electrically, pairs of conductive plates 204 from other pairs of conductive plates 204. In use, two conductive plates 204 are in physical and electrical contact with each conductor 110 of each of busway sections 102, 104, and 106. Insulator plates 202 maintain electrical and physical separation between a pair of conductive plates 204 contacting a first conductor of busway section 102, 104, and/or 106 and a pair of conductive plates 204 contacting a second conductor of busway section 102, 104, and/or 106 adjacent the first conductor 110. In the exemplary embodiment, insulator plates are thermoset fiberglass-reinforced polyester insulators. In other embodiments, any other suitable insulating material may be used to fabricate insulator plates 202. In some embodiments more than one insulator plate 120 may be positioned between adjacent conductive plates 204.

In the exemplary embodiment, insulator plates 202 have substantially the same shape as conductive plates 204. Insulator plates 202 are slightly larger than conductive plates 204. In other embodiments, insulator plates 202 may have any other suitable shape and size. In some embodiments, insulator plates 202 are not a single plate, but include multiple parts.

Stack 201 includes spacers 224 and 226 between pairs of conductive plates 204 to provide separation between conductive plates 204. In the exemplary embodiment, three spacers 224 and two spacers 226 are positioned between each pair of conductive plates 204 that will be contacting the same conductor 110. In some embodiments, inclusion of spacers 224 and 226 may enhance thermal performance, limit warping, and prevent collapsing of connector 200. Other embodiments may include more or fewer spacers 224 and 226, including no spacers 224 or 226. Moreover, other embodiments may, additionally or alternatively, include spacers 224 or 226 that are integrally formed in conductive plates 204.

Stack 201 includes spacers 228 and 230 between first cover plate 206 and the adjacent insulator plate 202 to provide separation and support. In the exemplary embodiment, three spacers 228 and two spacers 230 are positioned between first cover plate 206 and the adjacent insulator plate 202. Although not shown in FIG. 5, three spacer 228 and two spacers 230 are also positioned between second cover plate 209 and the insulator plate 202 adjacent to it. In some embodiments, inclusion of spacers 228 and 230 may enhance thermal performance, limit warping, and prevent collapsing of connector 200. Other embodiments may include more or fewer spacers 228 and 230, including no spacers 228 or 230. Moreover, other embodiments may, additionally or alternatively, include spacers 228 or 230 that are integrally formed in conductive plates 204.

Insulator plates 202 are also positioned to separate, both physically and electrically, conductive plates 204 from first cover plate 206 and second cover plate 209. More specifically, a top insulator plate 232 separates a top conductor plate 234 from first cover plate 206. A bottom insulator plate 236 separates a bottom conductor plate (not shown) from second cover plate 209. Thus, insulator plates 232 and 236 facilitate preventing electrical connection or physical contact between first and second cover plate 206 and 209 and conductive plates 204.

First cover plate 206 and second cover plate 209 cover the top and bottom of stack 201 and function as ground planes between first, second and third busway sections 102, 104, and 106. Cover plates 206 and 209 are coupled are coupled to busway sections 102, 104, and 106 by ground connectors 163 in the same manner as cover plates 124 and 128 (shown in FIG. 1 and described above). In the exemplary embodiment, first and second cover plates 206 and 209 are shaped substantially the same as conductive plates 204 and are fabricated from sheet steel. In other embodiments, first and second cover plates 206 and 209 may have any other suitable shape and/or may be fabricated from any other suitable electrically conductive material. In embodiments in which first and second cover plates 206 and 209 are not utilized as a ground path, first and second cover plates 206 and 209 may be fabricated from any nonconductive material suitable for covering the top and bottom of stack 201.

Connector 200 includes a first cover 238, a second cover 240, and a third cover 242 to provide additional protection, e.g. prevention of ingress of material, dust, etc., to connector 200 and, more particularly, to stack 201. First, second, and third covers 238, 240, and 242 are removably coupled to stack 201 and may be fabricated from any suitable material including, for example, steel, aluminum, plastic, and/or fiberglass. First, second, and third covers 238, 240, and 242 are generally coupled to the remainder of connector 200 after connector 200 is coupled to two or more of the first, second, and third busway sections 102, 104, and 106. Covers 238, 240, and 242 each include flanges 244 that are configured, e.g., sized, shaped, etc., to at least partially overlie and/or underlie housing 112. Moreover, covers 238, 240, and 242 each include tabs configured to be fit within a channel 182 within housing 112.

Connector 200 includes two lifting hooks 244. Lifting hooks 244 are L-shaped hooks that facilitate lifting, grasping, maneuvering, etc. connector 200, such as during assembly of connector 200, installation or removal of connector 200, etc. Lifting hooks 244 are attached to connector 200 adjacent first cover plate 206 using connectors 212. More specifically, each lifting hook 244 is attached to connector 200 with one of fasteners 212. The particular fasteners 212 that are used to attach lifting hooks 244 to connector 200 are also used to couple stack 201 and first and second cover plates 206 and 209. In other embodiments, more or fewer lifting hooks 244, including no lifting hooks 244, may be coupled to connector 200. Moreover, in some embodiments, lifting hooks 244 may be integrally formed with first cover plate 206.

To perform an installation using connector 200, first busway section 102 is inserted into first end 214, second busway section 104 is inserted into second end 216, and third busway section 106 is inserted into third end 218. Fasteners 212 are tightened by the user to compress stack 201 to facilitate contact between conductors 110 and conductive plates 204 and to retain busway sections 102, 104, and 106 coupled to connector 200. Covers 238, 240, and 242 are then attached.

Described herein are exemplary methods and systems for coupling together a first, second, third busway component. More specifically, the exemplary embodiments described herein provide a compact "T" shaped connector. The exemplary connector is formed without welding, thereby reducing production difficulty, cost, and/or time. Moreover, the exemplary connector connects directly to busway sections. Thus, unlike some known systems, additional connectors for each busway section are not needed during installation. Moreover, the connectors include a removable cover made of separate cover pieces. These feature further reduce the production difficulty, cost, and/or time.

The methods and systems described herein facilitate efficient and economical manufacture and assembly of a busway based electrical distribution network. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A connector for interconnecting three busway sections, said connector comprising:
a plurality of unitary conductive plates having first and second opposing planar surfaces, each conductive plate of said plurality of conductive plates including a central section, a first arm extending from a first side of said central section, a second arm extending from a second side of said central section opposite the first side of said central section, and a third arm extending from a third side of said central section substantially orthogonal to said first and second arms, each of said conductive plates of said plurality of conductive plates stacked such that at least one of said first and second opposing planar surfaces are adjacent at least one of said first and second opposing planar surfaces of an adjacent conductive plate of said plurality of conductive plates;
a plurality of insulating plates interspersed between at least two adjacent pairs of conductive plates of said plurality of conductive plates; and
a plurality of fasteners extending through said plurality of conductive plates and said plurality of insulating plates.

2. A connector in accordance with claim 1, further comprising a plurality of spacers located between at least one pair of said conductive plates between which an insulating plate is not interspersed.

3. A connector in accordance with claim 1, wherein said first arms of said plurality of conductive plates are configured to couple to a first busway section, said second arms of said plurality of conductive plates are configured to couple to a second busway section, and said third arms of said plurality of conductive plates are configured to couple to a third busway section.

4. A connector in accordance with claim 3, wherein said connector is configured to couple directly to said first, second, and third busway sections.

5. A connector in accordance with claim 1, wherein each of said plurality of conductive plates is substantially "T" shaped.

6. A connector in accordance with claim 1, further comprising a top cover plate and a bottom cover plate, wherein said plurality of conductive plates comprises a top conductive plate and a bottom conductive plate, said top cover plate overlying said top conductive plate, said bottom cover plate underlying said bottom conductive plate.

7. A connector in accordance with claim 6, wherein a first one of said plurality of insulating plates is positioned between said top cover plate and said top conductive plate, and a second one of said plurality of insulating plates is positioned between said bottom cover plate and said bottom conductive plate.

8. A connector in accordance with claim 6, wherein said top cover plate and said bottom cover plate are shaped substantially the same as said plurality of conductive plates.

9. A connector in accordance with claim 6, further comprising at least one lifting hook extending from a surface of said top cover plate opposite said top conductive plate.

10. A connector in accordance with claim 1, further comprising a plurality of removable covers defining a first opening for receiving a first busway section for coupling to said first arms of said plurality of conductive plates, a second opening for receiving a second busway section for coupling to said second arms of said plurality of conductive plates, and a third opening for receiving a second busway section for coupling to said third arms of said plurality of conductive plates.

11. A connector for interconnecting three busway sections, said connector comprising:
    a stack of substantially "T" shaped plate conductors, at least two of the plate conductors separated from one another by an insulator plate, said stack having a first end configured to couple to a first busway section, a second end configured to couple to a second busway section, and a third end configured to couple to a third busway section;
    a top cover plate;
    a bottom cover plate;
    a top insulator plate; and
    a bottom insulator plate;
    wherein said top insulator plate couples said top cover plate to said stack, and said bottom insulator plate couples said bottom cover plate to said stack.

12. A connector in accordance with claim 11, wherein a plurality of spacers is integrally formed in said insulator plate.

13. A connector in accordance with claim 11, wherein a plurality of spacers are coupled between at least two of said plate conductors that are not separated from each other by said insulator plate.

14. A connector in accordance with claim 11, wherein each of the substantially "T" shaped plate conductors is formed without welding.

15. A connector in accordance with claim 11, further comprising at least one lifting hook extending from a surface of said top cover plate opposite said stack.

16. A weldless tee joint connector for interconnecting three busway sections, said connector comprising:
    a stack of insulator plates and conductive plates, at least one insulator plate positioned between two adjacent conductive plates, said stack defining a first extension for coupling to a first busway section, a second extension for coupling to a second busway section, and a third extension for coupling to a third busway section;
    a first cover plate adjacent a top of said stack;
    a second cover plate adjacent a bottom of said stack; and
    a plurality of fasteners extending through said first cover plate, said stack, and said second cover plate.

17. A connector in accordance with claim 16, wherein said stack, said first cover plate, and said second cover plate are configured for direct connection to a first, second, and third busway section.

18. A connector in accordance with claim 16, wherein the at least one insulator plate positioned between two adjacent conductive plates comprises a plurality of integrally formed spacers configured to extend between the adjacent conductive plates.

19. A connector in accordance with claim 16, further comprising a plurality of spacers positioned between at least two adjacent conductive plates.

20. A connector in accordance with claim 16, further comprising at least one lifting hook extending from a surface of said first cover plate opposite said stack.

* * * * *